(12) United States Patent
Amer et al.

(10) Patent No.: US 12,452,046 B2
(45) Date of Patent: Oct. 21, 2025

(54) SYSTEMS AND METHODS FOR SECURE CRYPTOGRAPHIC SECRET DISTRIBUTION

(71) Applicant: JPMORGAN CHASE BANK, N.A., New York, NY (US)

(72) Inventors: Omar Amer, New York, NY (US); Charles Lim, Singapore (SG); Marco Pistoia, Amawalk, NY (US); Andrew Lang, Avon, CT (US); Vas Rajan, New York, NY (US); Kaushik Chakraborty, Singapore (SG); Saqib Malik, Colonia, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 245 days.

(21) Appl. No.: 18/304,892

(22) Filed: Apr. 21, 2023

(65) Prior Publication Data
US 2024/0356741 A1 Oct. 24, 2024

(51) Int. Cl.
*H04L 9/08* (2006.01)
*H04L 9/40* (2022.01)

(52) U.S. Cl.
CPC .......... *H04L 9/0855* (2013.01); *H04L 63/166* (2013.01)

(58) Field of Classification Search
CPC .............................. H04L 9/0855; H04L 63/166
USPC ......................................................... 713/189
See application file for complete search history.

(56) References Cited

U.S. PATENT DOCUMENTS

| | | | | |
|---|---|---|---|---|
| 9,516,002 | B2 * | 12/2016 | O'Hare | H04L 63/0272 |
| 10,068,082 | B1 * | 9/2018 | Zheng | G06F 21/45 |
| 10,686,779 | B2 * | 6/2020 | Glozman | H04L 63/0428 |
| 11,057,196 | B2 * | 7/2021 | Schiffman | H04W 76/14 |
| 12,052,352 | B2 * | 7/2024 | Richdale | H04L 9/0855 |
| 12,225,115 | B2 * | 2/2025 | Le Saint | H04L 9/085 |

(Continued)

FOREIGN PATENT DOCUMENTS

| | | | | |
|---|---|---|---|---|
| EP | 4006769 | A1 * | 6/2022 | G06K 7/10 |
| WO | 2012044855 | | 4/2012 | |

(Continued)

OTHER PUBLICATIONS

International Search Report and Written Opinion of the International Searching Authority, dated May 20, 2025, from corresponding International Application No. PCT/US2024/024590.

*Primary Examiner* — Samson B Lemma
(74) *Attorney, Agent, or Firm* — GREENBERG TRAURIG LLP

(57) ABSTRACT

Systems and methods for secure cryptographic secret distribution are disclosed. In one embodiment, a method for secure cryptographic secret distribution may include: (1) receiving, at a key relay station, a cryptographic secret from a webserver over a first communication network; (2) storing, by the key relay station, the cryptographic secret; (3) authenticating, by the key relay station, an end user via an end user electronic device; and (4) securely communicating, by the key relay station, the cryptographic secret to the end user electronic device. The end user electronic device is configured to store the cryptographic secret in secure storage on the end user electronic device, to encrypt data with the cryptographic secret, and to communicate the encrypted data to the webserver over a second communication network.

15 Claims, 5 Drawing Sheets

(56) References Cited

U.S. PATENT DOCUMENTS

| | | | |
|---|---|---|---|
| 2004/0111601 A1* | 6/2004 | Racz | H04L 9/0838 |
| | | | 713/150 |
| 2011/0202755 A1* | 8/2011 | Orsini | H04L 9/0816 |
| | | | 713/151 |
| 2017/0019380 A1* | 1/2017 | Dover | H04L 9/0825 |
| 2020/0053072 A1* | 2/2020 | Glozman | H04W 12/08 |
| 2020/0259651 A1* | 8/2020 | Mohassel | H04L 9/3218 |
| 2021/0044433 A1 | 2/2021 | Hay et al. | |
| 2021/0111875 A1* | 4/2021 | Le Saint | H04L 9/3263 |
| 2022/0191190 A1* | 6/2022 | Glozman | H04L 9/3215 |
| 2022/0360435 A1* | 11/2022 | Choi | H04L 9/0836 |
| 2023/0018829 A1* | 1/2023 | Cho | H04L 9/0825 |
| 2023/0020193 A1 | 1/2023 | Williams et al. | |
| 2023/0106151 A1* | 4/2023 | Mohassel | H04L 9/0838 |
| | | | 713/155 |
| 2023/0108034 A1* | 4/2023 | Fischer | H04L 9/3242 |
| | | | 713/183 |
| 2023/0155821 A1* | 5/2023 | Le Saint | G06F 21/602 |
| | | | 713/164 |
| 2024/0313949 A1* | 9/2024 | Yeomans | H04L 9/0855 |

FOREIGN PATENT DOCUMENTS

| | | | | |
|---|---|---|---|---|
| WO | WO-2021257664 A1 * | 12/2021 | | G16H 20/17 |
| WO | WO-2022162390 A1 * | 8/2022 | | H04L 9/0819 |

\* cited by examiner

SYSTEMS AND METHODS FOR SECURE CRYPTOGRAPHIC SECRET DISTRIBUTION

BACKGROUND OF THE INVENTION

1. Field of the Invention

Embodiments relate to systems and methods for secure cryptographic secret distribution.

2. Description of the Related Art

Cryptographic secret distribution protocols, such as quantum key distribution (QKD) protocols, enable remote parties with access to an untrusted quantum channel as well as a public and authenticated classical channel to establish a secret key without the need for the use of computational assumptions, a feat that is not possible if limited to only classical information. QKD protocols can be shown to be provably secure against (quantum-)computationally unbounded attackers based on the principles of quantum mechanics and information theory, making them an important cryptographic tool in light of advances in cryptanalysis fueled by quantum computing.

To achieve these advantages over classical protocols, QKD protocols naturally make use of quantum communication as a central resource, most commonly realizing this capability through fiber connections between endpoints. The use of fiber as a medium makes QKD naturally suited towards deployment in certain high-capacity communication infrastructure, such as between data centers with dedicated fiber links between them, but it can also result in some limitations. For example, the need for a quantum channel (e.g., fiber connectivity) between connected parties limits the practicality of establishing QKD keys directly with an end-user, who likely is not connected to QKD network or potentially even a fiber network.

SUMMARY OF THE INVENTION

Systems and methods for secure cryptographic secret distribution are disclosed. In one embodiment, a method for secure cryptographic secret distribution may include: (1) receiving, at a key relay station, a cryptographic secret from a webserver over a first communication network; (2) storing, by the key relay station, the cryptographic secret; (3) authenticating, by the key relay station, an end user via an end user electronic device; and (4) securely communicating, by the key relay station, the cryptographic secret to the end user electronic device. The end user electronic device is configured to store the cryptographic secret in secure storage on the end user electronic device, to encrypt data with the cryptographic secret, and to communicate the encrypted data to the webserver over a second communication network.

In one embodiment, the method may also include distilling, by the key relay station and with the webserver, the cryptographic secret using a quantum key distribution protocol. The cryptographic secret may include a quantum key.

In one embodiment, the key relay station may securely communicate the cryptographic secret to the end user electronic device using near field communication. In another embodiment, the key relay station may securely communicate the cryptographic secret to the end user electronic device by displaying a machine-readable code comprising the cryptographic secret on a display, and the end user electronic device may capture an image of the machine-readable code and may extract the cryptographic secret from the image of the machine-readable code.

In one embodiment, the end user electronic device may communicate the encrypted data to the webserver using symmetric or asymmetric encryption.

In one embodiment, the end user electronic device may communicate the encrypted data to the webserver over a Transport Layer Security or an Internet Protocol Security tunnel.

According to another embodiment, a method for secure cryptographic secret distribution may include: (1) receiving, at a trusted router, a cryptographic secret from webserver via a local content distribution network server over a first communication network; (2) receiving, by the trusted router, a connection from an end user electronic device on a network provided by the trusted router; and (3) communicating, by the trusted router, the cryptographic secret to the end user electronic device over the network. The end user electronic device is configured to store the cryptographic secret in secure storage on the end user electronic device, to encrypt data with the cryptographic secret, and to communicate the encrypted data to the webserver over a second communication network.

In one embodiment, the webserver and the local content distribution network server may be configured to distill the cryptographic secret using a quantum key distribution protocol. The cryptographic secret may include a quantum key.

In one embodiment, the end user electronic device may communicate the encrypted data to the webserver using symmetric or asymmetric encryption.

In one embodiment, the end user electronic device may communicate the encrypted data to the webserver over a Transport Layer Security or an Internet Protocol Security tunnel.

In one embodiment, the network provided by the trusted router is a closed network.

In one embodiment, the method may also include authenticating, by the trusted router, the end user electronic device.

According to another embodiment, a system may include a webserver, a key relay station in communication with the webserver over a first communication network, and an end user electronic device. The key relay station receives a cryptographic secret from the webserver over the first communication network, stores the cryptographic secret, authenticates an end user via the end user electronic device, and securely communicates the cryptographic secret to the end user electronic device. The end user electronic device stores the cryptographic secret in secure storage on the end user electronic device, encrypts data with the cryptographic secret, and communicates the encrypted data to the webserver over a second communication network. The webserver decrypts the encrypted data using the cryptographic secret.

In one embodiment, the key relay station and the webserver may distill the cryptographic secret using a quantum key distribution protocol, and the cryptographic secret comprises a quantum key.

In one embodiment, the key relay station may securely communicate the cryptographic secret to the end user electronic device using near field communication.

In one embodiment, the key relay station may securely communicate the cryptographic secret to the end user electronic device by displaying a machine-readable code comprising the cryptographic secret on a display, and the end user electronic device may capture an image of the machine-readable code and may extract the cryptographic secret from the image of the machine-readable code.

In one embodiment, the end user electronic device may communicate the encrypted data to the webserver using symmetric or asymmetric encryption.

In one embodiment, the end user electronic device may communicate the encrypted data to the webserver over a Transport Layer Security or an Internet Protocol Security tunnel.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
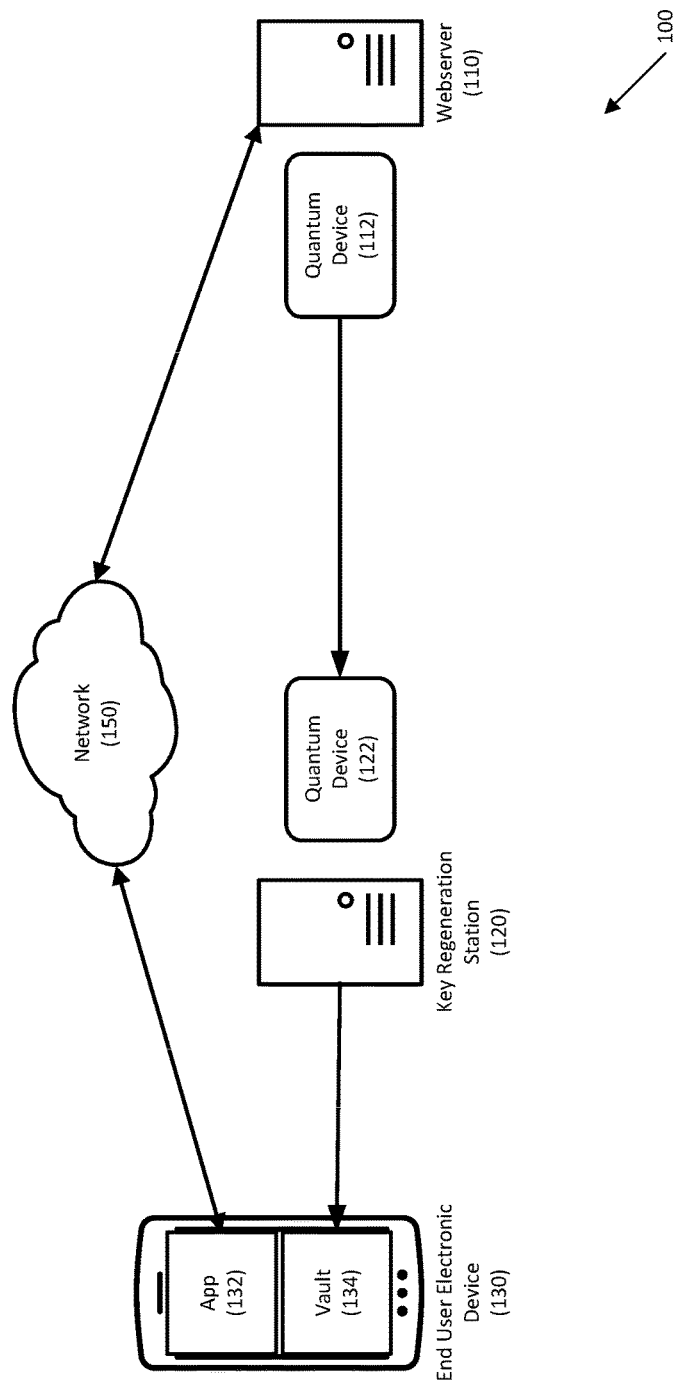
FIG. 1 illustrates a system for secure cryptographic secret distribution according to an embodiment.

Embodiments relate to systems and methods for secure cryptographic secret distribution.

The disclosure of U.S. patent application Ser. No. 18/174,768, filed Feb. 27, 2023 is hereby incorporated, by reference, in its entirety.

Embodiments may distribute any suitable cryptographic secret, such as any cryptographic material, between two nodes (e.g., devices) that are very close to each other so that wireless technologies, such as near field communication, Bluetooth Low Energy, optical machine-readable codes (e.g., QR codes, etc.) may be used to communicate the cryptographic secret from one node to the other. Thus, embodiments may leverage physical constraints—such as proximity—to securely exchange the cryptographic secret. While QKD is an example of the distribution of a cryptographic secret, where a key may be exchanged between a QKD-connected piece of infrastructure (e.g., a regeneration station, a trusted router, etc.) and an end user's electronic device (e.g., a computer, a mobile phone, etc.). user in order to enable end-to-end connectivity from a web application (e.g., an online banking service) and an end-user's device (e.g., a computer or a mobile phone).

Embodiments may use a client-side vault that may be provided with a cryptographic secret, such as a quantum key. When an end user's device is in a trusted location, such as in close proximity to the client-side vault, the cryptographic secret may be securely communicated to the end user's device. The cryptographic secret may be used to enable secure communications with a client backend, such as a webserver, when the user leaves the trusted location.

Embodiments may integrate a key management system and/or key vault with the application or web-application used by the end user that may be responsible for securely storing and managing the use of key material in a coordinated manner with the webserver.

For example, embodiments may use "branch locations," such as bank branches in the case of the financial industry, to host trusted key relay stations (KRS) for end users to receive or replenish their key vaults. For example, a webserver instance being accessed by the end user may be hosted on a server that may be directly connected to a backbone optical network connected to the branch location, which may be secured by QKD-based or other solutions. In the case when the webserver is hosted elsewhere, such as a public content distribution network (CDN), a mixture of this solution and other solutions (e.g., QKD-as-a-service and/or satellite connections) may be used.

In embodiments, periodically (e.g., at a frequency that may be configurable by the end user based on requirements), the end user may visit the trusted location (e.g., a bank branch) and may authenticate to the key relay station using the end user's credentials. For example, the end user may authenticate at an automated teller machine (ATM) that may be securely connected to a webserver and configured to offer key relay with the user's debit card and personal identification number. Once authenticated, the key relay station may display, for example, a QR code or similar, or may expose near field communication or similar access, that enables the transfer of a cryptographic secret (e.g., a cryptographic key) securely between the key relay station and the end user's electronic device.

The cryptographic secret may be transferred by any suitable method, and the methods may offer different levels of security. For example, the key relay station may transfer the "public" key of the webserver for a standard public key cryptosystem, thereby enabling the end user's electronic device to conduct a Transport Layer Security ("TLS") handshake without exposing the public key to attacker, thereby securing against a large class of potential attacks for which that information is necessary.

As another example with a higher level of security, the key relay station may transfer a symmetric master key to the user, thereby allowing the bulk-transfer of encrypted session keys between the webserver and the user that may then be stored in the key vault of the end user's electronic device. Once used, the master key may be deleted from all sources, and the security of the bulk session keys may be reliant on the security of the master key.

As another example with an even higher level of security, the key relay station may enable a direct transfer of bulk key-material. The number of keys in the bulk transfer may be configurable by, for example, the end user. The number of keys may be based on, for example, a desired frequency of key use, replenishment needs, storage available, etc.

The transferred key material may be by the user electronic device and the webserver to engage in normal communications, such symmetric or asymmetric encrypted communications, either using pre-shared keys or through a public key handshake with a hidden public key. In one embodiment, end user electronic devices that have been loaded with keys may also be used as a key relay station in order to supply keys to other trusted/secured electronic devices owned by the end user, such as a laptop, a desktop, etc.

In one embodiment, in addition to key relay stations, the end user's home network may serve as a trusted network in which cryptographic secret distribution and/or key relay may occur. For example, the end user may configure a web application (e.g., an online banking application) with information regarding a trusted network, such as the end user's home network. When the end user successfully authenticates to the webserver using, for example, a username and password, and the webserver verifies that the end user is within their trusted network (e.g., using standard IP-based techniques), the end user may be allowed to request a cryptographic secret distribution, a key refresh, etc. A vault system on the end user's electronic device may be filled or refilled with the appropriate keys as described above. Prior to this point, communication with the webserver and the end user's home network may be encrypted and authenticated using cryptographic secret share on the chain of links connecting the end user's home network and the web server. When the end user is outside of the end user's home network, the loaded keys may be used to secure communications with the webserver.

Referring to FIG. 1, a system for secure cryptographic secret distribution is disclosed according to an embodiment. System 100 may include webserver 110, which may be hosted on any suitable electronic device, including physical servers and/or cloud-based servers. Webserver 110 may have a secure communication with key relay station 120, such as a kiosk, a bank ATM, etc. The secure communication may be provided using a QKD network including quantum devices 112 and 122. Any other security mechanism may be provided as is necessary and/or desired.

Webserver 110 may provide a cryptographic secret, such as cryptographic material, to key relay station 120 for distribution to end user electronic device 130. In one embodiment, the cryptographic secret may include one or more quantum keys that are distilled by quantum devices 112 and 122.

In another embodiment, webserver 110 may securely communicate a cryptographic secret to key relay station 120.

End user electronic device 130 may be any suitable electronic device, including computers (e.g., notebooks, laptops, tablets, etc.), smart devices (e.g., smart phones, smart watches, etc.), Internet of Things (IoT) appliances, etc. End user electronic device 130 may execute one or more computer programs, including application 132.

End user electronic device 130 may receive one or more cryptographic secrets from key relay stations 120 after the end user has authenticated to key relay station 120 and/or webserver 110. Key relay station 120 may display the cryptographic secret(s) to end user electronic device 130 as a machine readable code, such as a QR code, or may communicate the cryptographic secret(s) via NFC communication. End user electronic device 130 may then store the cryptographic secret(s) in secure storage, such as vault 134. An example of vault 134 is a secure enclave in end user electronic device 130. Application 132 may then use the cryptographic secret to securely communicate with webserver 110 via network 150 using, for example, symmetric or asymmetric encryption. In one embodiment, the communication may be over a Transport Security Layer (TSL) tunnel, or an Internet Protocol Security (IPSec) tunnel, through network 150.

Figure 2:
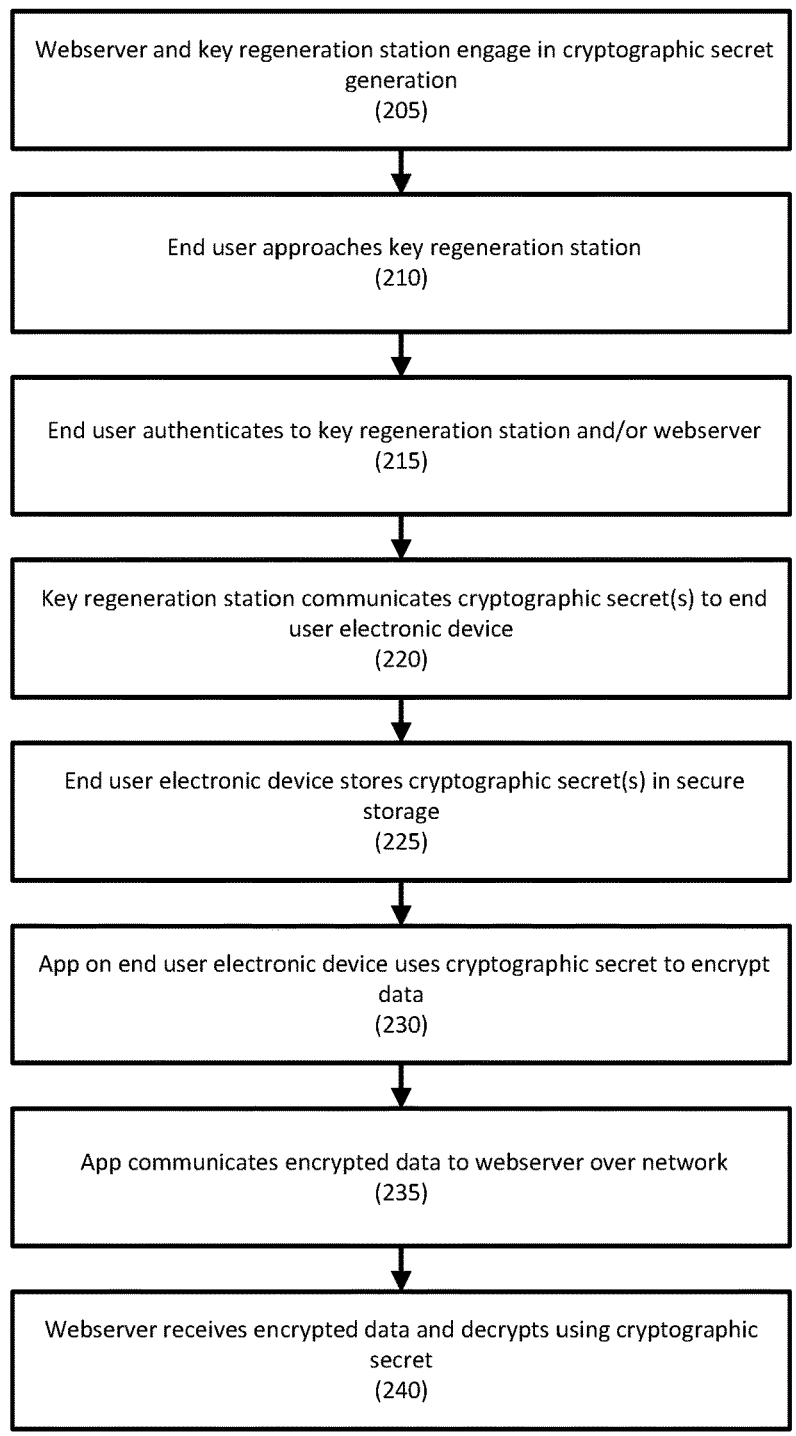
FIG. 2 illustrates a method for secure cryptographic secret distribution according to an embodiment.

Referring to FIG. 2, a method for secure cryptographic secret distribution is disclosed according to an embodiment.

In step 205, a webserver and a key relay station may engage in cryptographic secret generation. For example, the webserver and key relay station may distill a quantum key. In another embodiment, the webserver may securely communicate a cryptographic secret to the key relay station. The key relay station may store the cryptographic secret.

In one embodiment, the quantum key may be distilled using a quantum key protocol, such as BB84, E91, Device Independent Quantum Key Distribution, Twin Fields Quantum Key Distribution, etc.

In step 210, an end user with an end user electronic device may approach the key relay station, and in step 215, may authenticate to the key relay station and/or webserver. For example, the end user may provide credentials, such as an ATM card and a PIN, a biometric, a username and password, etc. to the key relay station and the key relay station and/or webserver may authenticate the end user.

In step 220, the key relay station may securely communicate one or more cryptographic secrets to end user electronic device. For example, a display on the key relay station may display a machine-readable code, such as a QR code, that includes the cryptographic secret and the end user electronic device may capture an image of the machine-readable code using a camera and may extract the cryptographic secret from the image of the machine-readable code. As another example, the key relay station may provide one or more cryptographic secrets via NFC, and the end user electronic device may receive the cryptographic secret(s).

In step 225, the end user electronic device may store the cryptographic secret(s) in secure storage on the electronic device, such as a secure enclave.

In step 230, an application or computer program executed by the end user electronic device may encrypt data for the webserver using the cryptographic secret(s), and, in step 235, may communicate the encrypted data to the webserver using, for example, symmetric or asymmetric encryption over a network, such as the Internet.

In step 240, the webserver may receive the encrypted data and may decrypt the data using cryptographic secret.

Figure 3:
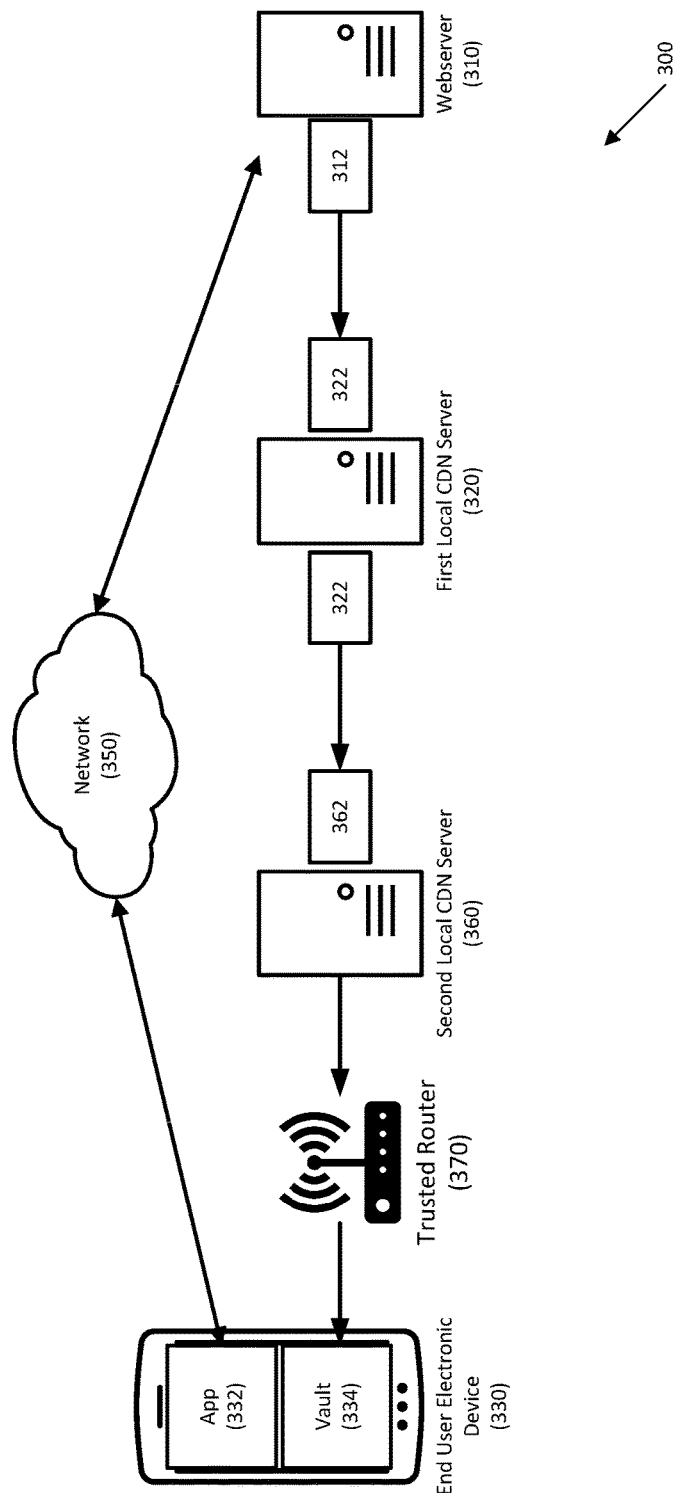
FIG. 3 illustrates a system for secure cryptographic secret distribution according to another embodiment.

Referring to FIG. 3, a system for secure cryptographic secret distribution according to another embodiment. System 300 may include webserver 310, which may be hosted on any suitable electronic device, including physical servers and/or cloud-based servers. Webserver 310 may have a secure communication with first local CDN server, which may serve content for a first local network. The secure communication between webserver 310 and first local CDN server may be provided using a QKD network including quantum devices 312 and 322. Any other security mechanism may be provided as is necessary and/or desired.

Webserver 310 may provide a cryptographic secret, such as cryptographic material, to first local CDN server for distribution to second local CDN server 360, trusted router 370, and to end user electronic device 330. In one embodiment, the cryptographic secret may include one or more quantum keys that are distilled by quantum devices 312 and 322, and/or quantum devices 322 and 362.

First local CDN server 320 and second local CDN server 360 may also distill a cryptographic secret using quantum devices 322 and 362.

In another embodiment, webserver 310 may securely communicate a cryptographic secret to the first local CDN server 320, which may securely communicate the cryptographic secret to second local CDN server 360, which may securely communicate the cryptographic secret to trusted router 370.

It should be noted that second local CDN server is optional, and first local CDN server 320 may securely communicate the cryptographic secret to trusted router 370 directly.

First local CDN server 320 and second local CDN server 360 may be any suitable servers of content.

End user electronic device 330 may be any suitable electronic device, including computers (e.g., notebooks, laptops, tablets, etc.), smart devices (e.g., smart phones, smart watches, etc.), Internet of Things (IoT) appliances, etc. End user electronic device 330 may execute one or more computer programs, including application 332.

End user electronic device 330 may receive one or more cryptographic secrets from trusted router 370 over, for example, a network provided by trusted router 370. In one embodiment, the network provided by trusted router 370 may be a closed (e.g., secure) network that requires authentication or authorization. End user electronic device 330 may then store the cryptographic secret(s) in secure storage, such as vault 334. An example of vault 334 is a secure enclave in end user electronic device 330. Application 332 may then use the cryptographic secret to securely communicate with webserver 310 via network 350 using, for example, symmetric or asymmetric encryption.

Figure 4:
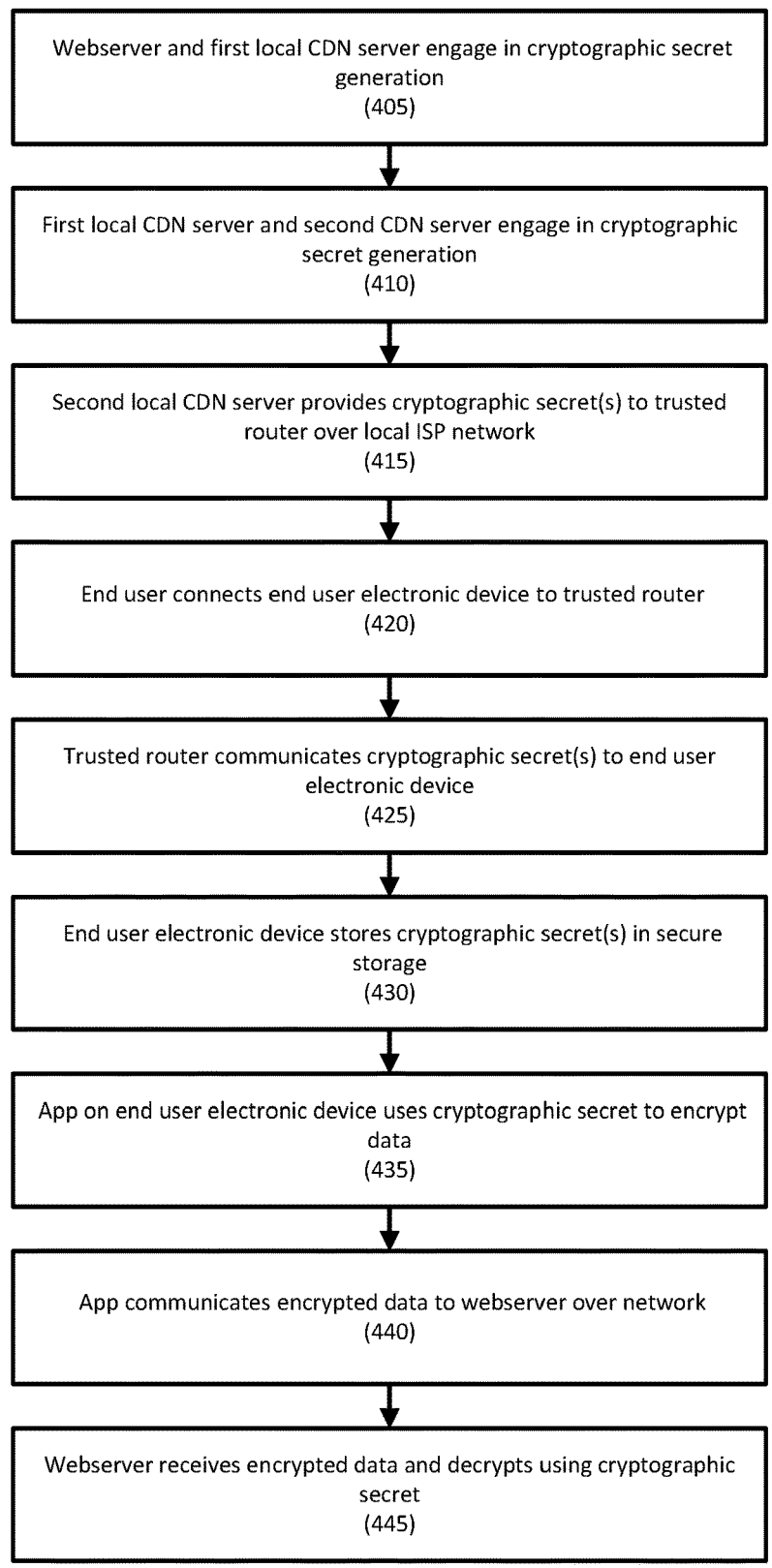
FIG. 4 illustrates a method for secure cryptographic secret distribution according to another embodiment.

Referring to FIG. 4, a method for secure cryptographic secret distribution according to another embodiment.

In step 405, a webserver and a first local CDN server may engage in cryptographic secret generation. For example, the webserver and first local CDN server may distill a quantum key. In another embodiment, the webserver may securely communicate a cryptographic secret to the key relay station. The first local CDN server may store the cryptographic secret.

In step 410, the first local CDN server and a second CDN server may engage in cryptographic secret generation. Alternately, the first local CDN server may forward the cryptographic secret from the webserver to the second local CDN server.

In step 415, the second local CDN server may provide the cryptographic secret to a trusted router over a local ISP network. The trusted router may be part of a home network, a corporate network, etc.

In step 420, an end user may connect an end user electronic device to the trusted router by, for example, joining the trusted router's network. For example, the end user may approach the key relay station may authenticate to the trusted router if necessary. For example, the end user electronic device may be required to be registered with the network before it can access the network.

In embodiments, standard mobile internet protocols may be used to connect the end user electronic device to the trusted router's network. For example, the end user electronic device may be registered in the local network (i.e., the end user's home network) using mobile internet protocol authentication mechanisms.

In step 425, the trusted router may communicate the cryptographic secret(s) to the end user electronic device. For example, the trusted router may communicate the cryptographic secret(s) over the network once the end user electronic device is connected.

In embodiments, standard WiFi security protocols, such as WPA2, WPA3, etc. may be used to secure the transfer of the cryptographic secret from the trusted router to the end user electronic device.

In step 430, the end user electronic device may store the cryptographic secret(s) in secure storage on the electronic device, such as a secure enclave.

In step 435, an application or computer program executed by the end user electronic device may encrypt data for the webserver using the cryptographic key(s), and, in step 440, may communicate the encrypted data to the webserver using, for example, symmetric or asymmetric encryption over a network, such as the Internet.

In step 445, the webserver may receive the encrypted data and may decrypt the data using cryptographic secret.

Figure 5:
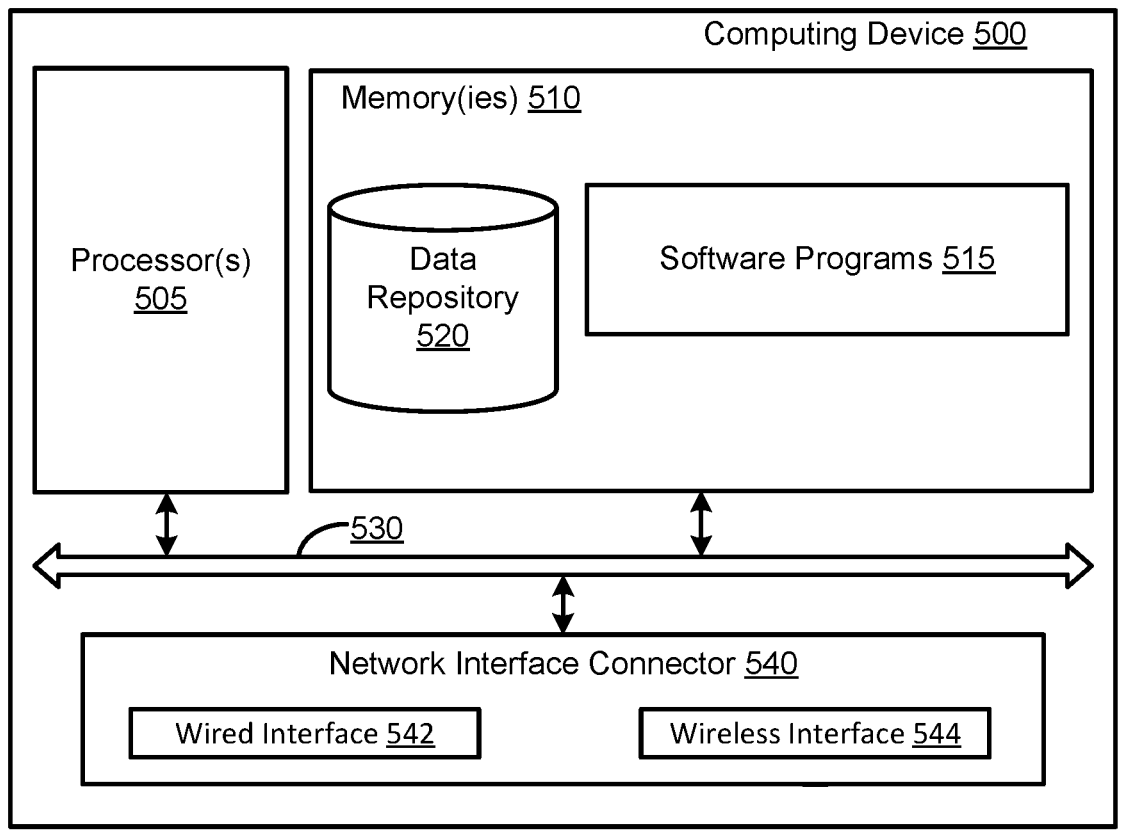
FIG. 5 depicts an exemplary computing system for implementing aspects of the present disclosure.

FIG. 5 depicts an exemplary computing system for implementing aspects of the present disclosure. FIG. 5 depicts exemplary computing device 500. Computing device 500 may represent the system components described herein. Computing device 500 may include processor 505 that may be coupled to memory 510. Memory 510 may include volatile memory. Processor 505 may execute computer-executable program code stored in memory 510, such as software programs 515. Software programs 515 may include one or more of the logical steps disclosed herein as a programmatic instruction, which may be executed by processor 505. Memory 510 may also include data repository 520, which may be nonvolatile memory for data persistence. Processor 505 and memory 510 may be coupled by bus 530. Bus 530 may also be coupled to one or more network interface connectors 540, such as wired network interface 542 or wireless network interface 544. Computing device 500 may also have user interface components, such as a screen for displaying graphical user interfaces and receiving input from the user, a mouse, a keyboard and/or other input/output components (not shown).

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may be a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA (Field-Programmable Gate Array), PLD (Programmable Logic Device), PLA (Programmable Logic Array), or PAL (Programmable Array Logic), or any other device or arrangement of devices that is capable of implementing the steps of the processes disclosed herein.

The processing machine used to implement embodiments may utilize a suitable operating system.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, a LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of a compact disc, a DVD, an integrated circuit, a hard disk, a floppy disk, an optical disc, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while the embodiments of the present invention have been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for secure cryptographic secret distribution, comprising:
   receiving, at a trusted key relay station quantum device for a trusted key relay station, a cryptographic secret from a webserver quantum device for a webserver over a first communication network
   storing, by the trusted key relay station, the cryptographic secret;
   authenticating, by the trusted key relay station, an end user via an end user electronic device;
   generating, by the trusted key relay station, a machine-readable code comprising the cryptographic secret; and
   displaying, by the trusted key relay station, the cryptographic secret on a display on the trusted key relay station;
   wherein the end user electronic device is configured to capture an image of the machine-readable code on the display of the trusted key relay station, to extract the cryptographic secret from the machine-readable code, to store the cryptographic secret in secure storage on the end user electronic device, to encrypt data with the cryptographic secret, and to communicate the encrypted data to the webserver over a second communication network.

2. The method of claim 1, further comprising:
   distilling, by the trusted key relay station and with the webserver, the cryptographic secret using a quantum key distribution protocol.

3. The method of claim 2, wherein the cryptographic secret comprises a quantum key.

4. The method of claim 1, wherein the end user electronic device communicates the encrypted data to the webserver using symmetric or asymmetric encryption.

5. The method of claim 1, wherein the end user electronic device communicates the encrypted data to the webserver over a Transport Layer Security or an Internet Protocol Security tunnel.

6. A method for secure cryptographic secret distribution, comprising:
   receiving, at a trusted router quantum device for a trusted router, a cryptographic secret from a webserver quantum device for a webserver via a local content distribution network server over a first communication network; storing, by the trusted router, the cryptographic secret; receiving, by the trusted router, a connection from an end user electronic device on a network provided by the trusted router; authenticating by the trusted router, an end user electronic device; generating, by the trusted router, a machine-readable code comprising the cryptographic secret; displaying by the trusted router, the cryptographic secret on a display on the trusted router; wherein the end user electronic device is configured to capture an image of the machine-readable code on the display of the trusted router, to extract the cryptographic secret from the machine-readable code, to store the cryptographic secret in secure storage on the end user electronic device, to encrypt data with the cryptographic secret, and to communicate the encrypted data to the webserver over a second communication network.

7. The method of claim 6, wherein the webserver and the local content distribution network server are configured to distill the cryptographic secret using a quantum key distribution protocol.

8. The method of claim 7, wherein the cryptographic secret comprises a quantum key.

9. The method of claim 6, wherein the end user electronic device communicates the encrypted data to the webserver using symmetric or asymmetric encryption.

10. The method of claim 6, wherein the end user electronic device communicates the encrypted data to the webserver over a Transport Layer Security or an Internet Protocol Security tunnel.

11. The method of claim 6, wherein the network provided by the trusted router is a closed network.

12. A system, comprising:
    a webserver comprising a webserver quantum device;
    a trusted key relay station in communication with the webserver over a first communication network and comprising a trusted key relay station quantum device; and
    an end user electronic device;
    wherein:
      the trusted key relay station quantum device receives a cryptographic secret from the webserver quantum device over the first communication network, stores the cryptographic secret, authenticates an end user via the end user electronic device, generates a machine-readable code comprising the cryptographic secret, and displays the cryptographic secret on a display on the trusted key relay station;
      the end user electronic device captures an image of the machine-readable code on the display of the trusted key relay station, extracts the cryptographic secret from the machine-readable code, stores the cryptographic secret in secure storage on the end user electronic device, encrypts data with the cryptographic secret, and communicates the encrypted data to the webserver over a second communication network; and
      the webserver decrypts the encrypted data using the cryptographic secret.

13. The system of claim 12, wherein the trusted key relay station and the webserver distill the cryptographic secret using a quantum key distribution protocol, and the cryptographic secret comprises a quantum key.

14. The system of claim 12, wherein the end user electronic device communicates the encrypted data to the webserver using symmetric or asymmetric encryption.

15. The system of claim 12, wherein the end user electronic device communicates the encrypted data to the webserver over a Transport Layer Security or an Internet Protocol Security tunnel.

* * * * *